United States Patent
Weng et al.

(10) Patent No.: US 12,452,071 B2
(45) Date of Patent: Oct. 21, 2025

(54) AUTHENTICATION INFORMATION MANAGER COMPUTER PROGRAM PRODUCT AND DEVICE

(71) Applicant: EverMore Technology Inc., Hsinchu (TW)

(72) Inventors: Tsu-Pin Weng, Hsinchu (TW); Wu-Hsiung Huang, Hsinchu (TW); Jia-You Jiang, Hsinchu (TW); Yi-Yuan Ho, Hsinchu (TW); Hung-Ming Chen, Hsinchu (TW); Yuan-Sheng Chen, Hsinchu (TW)

(73) Assignee: EverMore Technology Inc., Hsinchu (TW)

(*) Notice: Subject to any disclaimer, the term of this patent is extended or adjusted under 35 U.S.C. 154(b) by 164 days.

(21) Appl. No.: 18/372,196

(22) Filed: Sep. 25, 2023

(65) Prior Publication Data
US 2024/0305462 A1 Sep. 12, 2024

(30) Foreign Application Priority Data

Mar. 10, 2023 (TW) .................... 112109000

(51) Int. Cl.
*H04L 9/32* (2006.01)
(52) U.S. Cl.
CPC .......... *H04L 9/3226* (2013.01); *H04L 9/3213* (2013.01); *H04L 9/3247* (2013.01)
(58) Field of Classification Search
CPC .... H04L 9/3213; H04L 9/3247; H04L 9/3226
See application file for complete search history.

(56) References Cited

U.S. PATENT DOCUMENTS

| | | | | |
|---|---|---|---|---|
| 9,053,313 B2* | 6/2015 | Hart | ................. | G06Q 20/40975 |
| 9,137,228 B1* | 9/2015 | Newstadt | ................. | H04L 63/08 |
| 10,430,786 B1* | 10/2019 | Camacho | ............ | H04L 63/0823 |
| 2008/0165955 A1* | 7/2008 | Ibrahim | ................. | H04L 9/0844 |
| | | | | 380/30 |
| 2011/0142234 A1* | 6/2011 | Rogers | ................. | G07F 7/1075 |
| | | | | 380/247 |
| 2012/0233209 A1* | 9/2012 | Cheng | ..................... | G06F 16/22 |
| | | | | 707/770 |
| 2015/0326569 A1* | 11/2015 | McNulty | ............ | G06F 21/6272 |
| | | | | 713/171 |

(Continued)

*Primary Examiner* — Mohammad A Siddiqi
(74) *Attorney, Agent, or Firm* — Demian K. Jackson; Jackson IPG PLLC

(57) ABSTRACT

The present invention relates to an authentication information manager computer program product, which is executed by a processing unit. The computer program product includes: a physical private key acquisition module configured to receive an identity information to form an initialization authentication information including a part of the identity information; an authentication information management module configured to record a first set of authentication information for logging into a first networking application; and a multiparty multifactor dynamic strong encryption authentication transmission module configured to implement a multiparty multifactor dynamic digital authentication method with strong encryption to transmit the transfigurated initialization authentication information to a network application serving device including an authentication information manager back end and a third-party security serving equipment to be verified.

6 Claims, 11 Drawing Sheets

(56) References Cited

U.S. PATENT DOCUMENTS

| | | | | |
|---|---|---|---|---|
| 2017/0093920 A1* | 3/2017 | Ducatel | ............... | G06F 21/316 |
| 2017/0109742 A1* | 4/2017 | Varadarajan | ............ | G06F 21/32 |
| 2018/0336554 A1* | 11/2018 | Trotter | ............... | H04L 63/0853 |
| 2018/0343123 A1* | 11/2018 | Liu | ....................... | H04L 9/3247 |
| 2019/0174304 A1* | 6/2019 | Tunnell | ............... | H04L 63/0838 |
| 2019/0251765 A1* | 8/2019 | Masters | ............... | H04L 63/105 |
| 2021/0203488 A1* | 7/2021 | Ståhl | ..................... | H04L 9/0631 |
| 2022/0330017 A1* | 10/2022 | Caserta | ................ | H04W 12/00 |
| 2023/0290239 A1* | 9/2023 | Tobias | .................. | G08C 17/02 |
| 2024/0405983 A1* | 12/2024 | Jiang | .................... | H04L 9/0861 |

\* cited by examiner

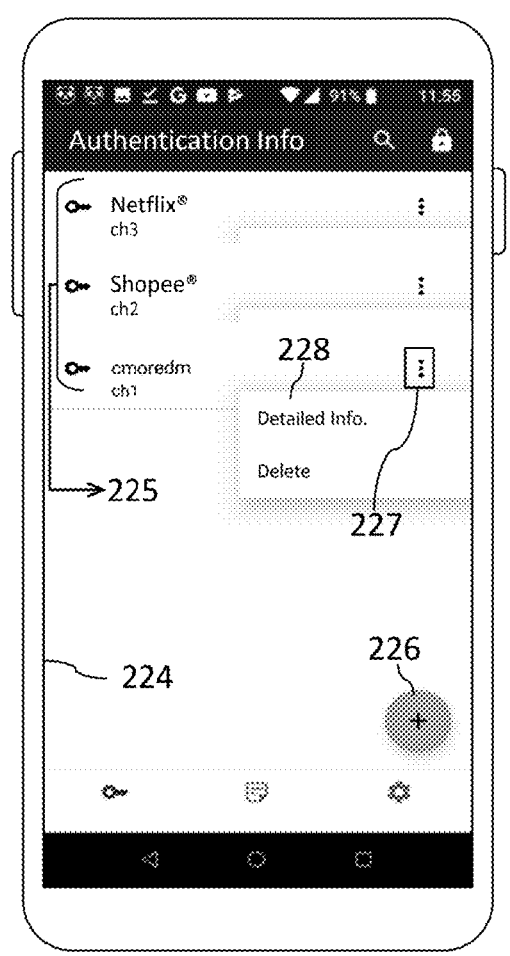
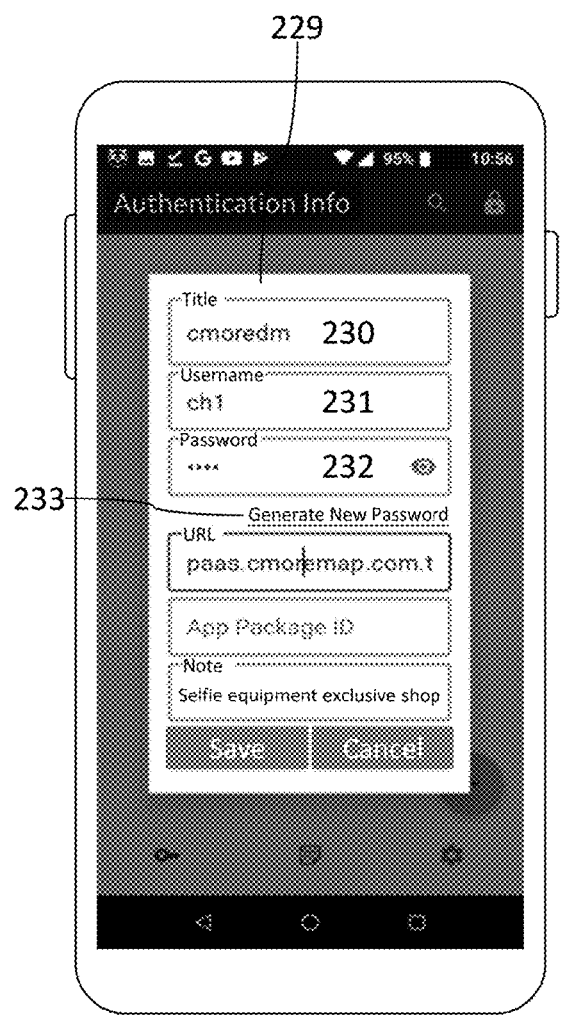
FIG. 15                          FIG. 16

AUTHENTICATION INFORMATION MANAGER COMPUTER PROGRAM PRODUCT AND DEVICE

CROSS-REFERENCE TO RELATED APPLICATION

This application claims priority benefit to Taiwan Invention Patent Application Serial No. 112109000, filed on Mar. 10, 2023, in Taiwan Intellectual Property Office, the entire disclosures of which are incorporated by reference herein.

FIELD

The present invention relates to an authentication information manager, in particular to an authentication information manager computer program product and device based on cyber-physical integrated multiparty multifactor dynamic digital authentication with strong encryption.

BACKGROUND

In the state of the art, based on the high returns that attackers can gain from successful attacks, many cyber security threats often aim to steal users' online account credentials, including username and password, to hack into networking applications with high economic value, resulting in the leak of confidential and sensitive information with economic value. These cybersecurity attacks pose significant threats to business operations by deploying some or all of the following common tactics.

1) Credential stuffing cracking, which repeatedly tries out all possible combinations of username and password until the correct combination has been found by using high-speed computing power; 2) pre-generation of attacking list containing the frequently-used password, which attempts to crack users' password according to the attacking list; 3) phishing attacks, which send seemingly trustworthy but fake emails to acquire user accounts and password due to user negligence; 3) keylogging, which plants Trojan horse programs on the user equipment to profile the keyboard input including username and password; 4) SQL injection, which exploits network database vulnerabilities to inject SQL commands to steal username, password, and credentials; 5) man-in-the-middle attacks, which intercept communications between users and websites to steal user accounts and certificate information; and 6) large-scale distributed denial-of-service (DDoS) attacks. Therefore, in the field of information security, the traditional password-based login authentication mode has long been proven insecure, and theft of user accounts and password is no longer news.

In the face of these threats, the usual anti-cracking measures include: using a combination of uppercase letters, lowercase letters, numbers, and symbols to form a strong password that is difficult to crack; using a second method such as security credentials, biometric authentication or SMS authentication to re-verify the user's identity, in addition to only verifying a single set of password; using encryption means to protect sensitive information, such as password, from interception by hackers; using a firewall to block unauthorized access and/or malicious access; installing antivirus and anti-malware software to detect and prevent malicious code from running on user equipment; regularly updating software to fix vulnerabilities and prevent hackers from exploiting them; and periodically auditing the security of systems and networks to identify and address cyber security vulnerabilities.

In addition, due to the rapid development of mobile application programs (Apps), everyone has a variety of number of Apps installed on their cell phone, including banking Apps, social media Apps such as Facebook® and Instagram©, online shopping Apps such as Shopee® and MomoShop®, the cloud storage Apps such as Dropbox© and Google Drive®, the email Apps, the Netflix® App (for video streaming), the fitness Apps, the music streaming Apps, the gaming Apps, and more. Undoubtedly, these Apps require an account password protection mechanism as well. Furthermore, when users need to use so many Apps, they inevitably demand a well-designed secure software tool to manage so much account and password information, which a software tool is better equipped to provide information security protection for sensitive information.

Hence, there is a need to solve the above deficiencies/issues.

SUMMARY

The present invention relates to an authentication information manager, in particular to an authentication information manager computer program product and device based on cyber-physical integrated multiparty multifactor dynamic digital authentication with strong encryption.

Accordingly, the present invention provides an authentication information manager computer program product, which is embodied on a non-transitory computer-readable storage medium and executed by a processor unit included in a user equipment. The computer program product includes: a physical private key acquisition module configured to receive provisioning identity information consisting at least a physical private key and receive a passcode to form an initialization authentication information including a part of the passcode and a part of the identity information; an authentication information management module configured to record a first set of authentication information for logging in to a first networking application; a multiparty multifactor dynamic strong encryption transmission module configured to transmit the transfigurated initialization authentication information to a network application serving device including an authentication information manager backend platform and a third-party security serving equipment for its performing autonomous digital signature verification, thus completes implementing a multiparty multifactor dynamic digital authentication method with strong encryption.

The present invention further provides an authentication information manager computer program product, which is embodied on a non-transitory computer-readable storage medium and executed by a processor unit included in a user equipment. The computer program product includes: an identity credential management module configured to receive a passcode and generate an identity credential to form an initialization authentication information including a part of the passcode and a part of the identity credential; an authentication information management module configured to record a first set of authentication information for logging in to a first networking application; and a multiparty multifactor dynamic strong encryption transmission module configured to transmit the transfigurated initialization authentication information to a network application serving device including an authentication information manager backend platform and a third-party security serving equipment for verification thus implementing a multiparty multifactor dynamic strong encryption authentication method.

The present invention further provides an authentication information manager device. The device includes modules executed by a processor unit as follows: an identity credential management module configured to receive a passcode and generate an identity credential to form an initialization authentication information including a part of the passcode and a part of the identity credential; an authentication information management module configured to record a first set of authentication information for logging in to a first networking application; and a multiparty multifactor dynamic strong encryption transmission module configured to transmit the transfigurated initialization authentication information to a network application serving device including an authentication information manager backend platform and a third-party security serving equipment for verification thus implementing a multiparty multifactor dynamic strong encryption authentication method.

The above content described in the summary is intended to provide a streamlined summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein:

FIG. 15 is the first operation schematic diagram illustrating the authentication information management interface for the authentication information manager computer program product according to the present invention;

FIG. 16 is a schematic diagram illustrating the authentication information editing window in the authentication information management interface of the authentication information manager computer program product according to the present invention;

DETAILED DESCRIPTION

Figure 1:
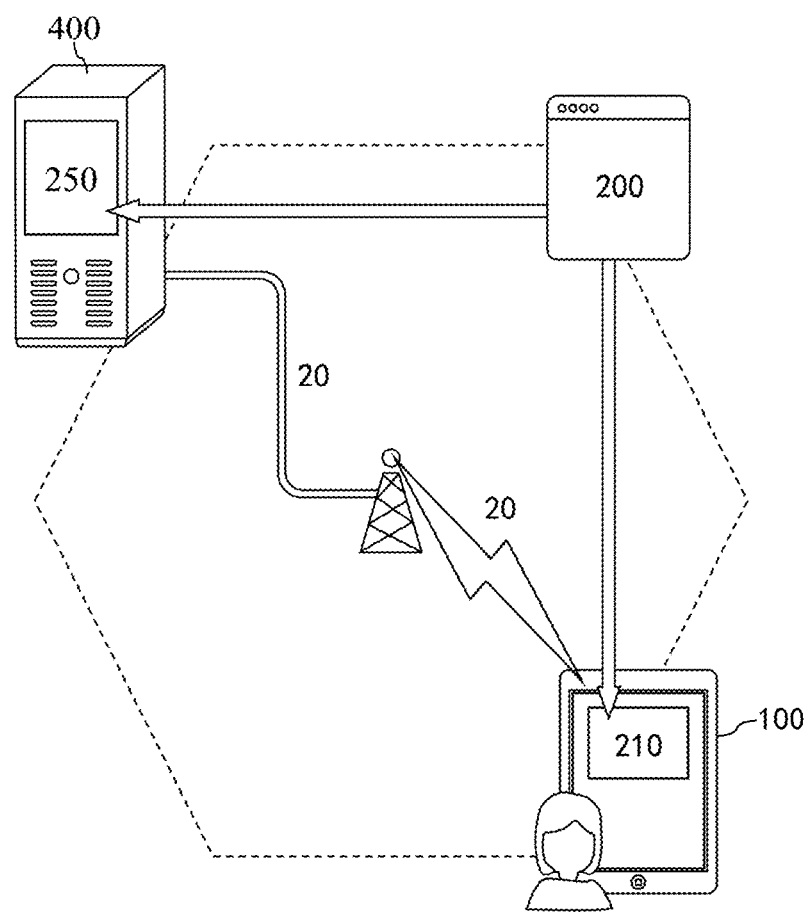
FIG. 1 is a schematic diagram illustrating the architecture for the authentication information manager platform according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn to scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

FIG. 1 is a schematic diagram illustrating the architecture for the authentication information manager platform according to the present invention. The authentication information manager device 100 includes an authentication information manager computer program product 210. The authentication information manager computer program product 210 is built in the form of a front-end interface and provided for users to use and operate, including but not limited to, an application program (App) that can be executed on mobile devices, a set of web-based network service pages that can be executed on browsers, or an application program that can be executed on a desktop computer. The authentication information manager computer program product 210 is communicatively connected with the authentication information manager backend platform 250, which is installed on a network application serving device 400 via the network 20 including an Internet or an Intranet. The authentication information manager computer program product 210, which acts as a front-end interface and the authentication information manager backend platform 250 together form an authentication information manager platform 200.

Figure 2:
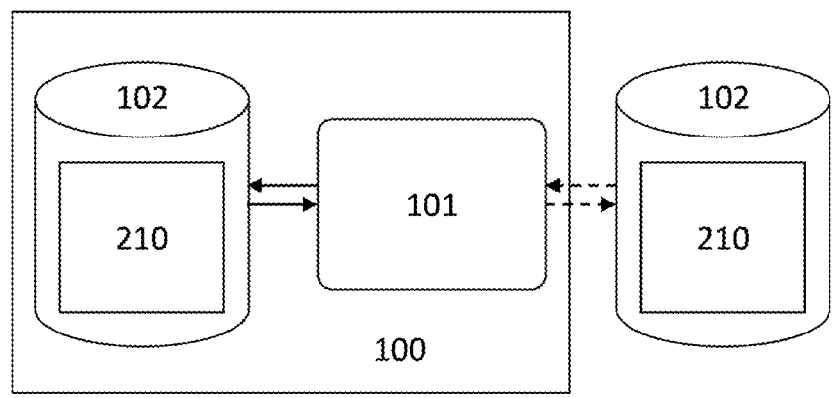
FIG. 2 is a schematic diagram illustrating the hardware architecture for the authentication information manager device according to the present invention.

FIG. 2 is a schematic diagram illustrating the hardware architecture for the authentication information manager device according to the present invention. The authentication information manager device 100 according to the present invention is preferably a user equipment used by ordinary consumers on a daily basis, such as, but not limited to, a smartphone, a tablet device, a laptop computer, a notebook computer or a desktop computer. Regardless of what type of device the authentication information manager device 100 is, its hardware structure includes at least one processor unit 101 and at least one storage medium 102. The storage medium 102 is preferably a local storage medium installed within the authentication information manager device 100, or an external storage medium, as shown in FIG. 2.

In one embodiment, the authentication information manager computer program product 210 is described in the form of an App, as an example. As the authentication information manager computer program product 210 is configured in the form of an App, the authentication information manager computer program product 210 is preinstalled on the authentication information manager device 100 and stored in the storage medium 102, and then executed by the processor unit 101 after being loaded into the internal processor unit 101 in the authentication information manager device 100.

Figure 3:
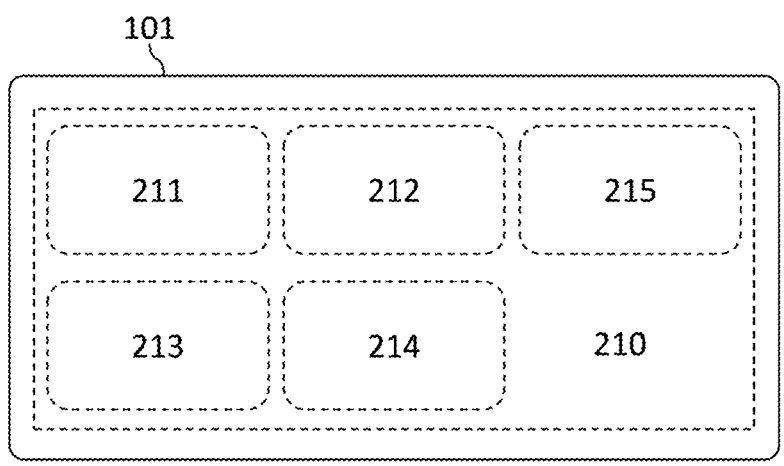
FIG. 3 is a schematic block diagram illustrating a plurality of programming modules executable by the processor unit according to the present invention.

FIG. 3 is a schematic block diagram illustrating a plurality of programming modules executable by the processor unit according to the present invention. The authentication information manager computer program product 210 includes multiple different programming modules. These programming modules and the authentication information manager computer program product 210 are pre-stored in the storage medium 102, and then executed by the processor unit 101 after being loaded into the processor unit 101. These programming modules include but are not limited to, a computer code of a physical private key acquisition module 211, a computer code of a multiparty multifactor dynamic strong encryption transmission module 212, a computer code of an authentication information management module 213, a computer code of a strong password generation module 214, and a computer code of an autofill module 215.

Figure 4:
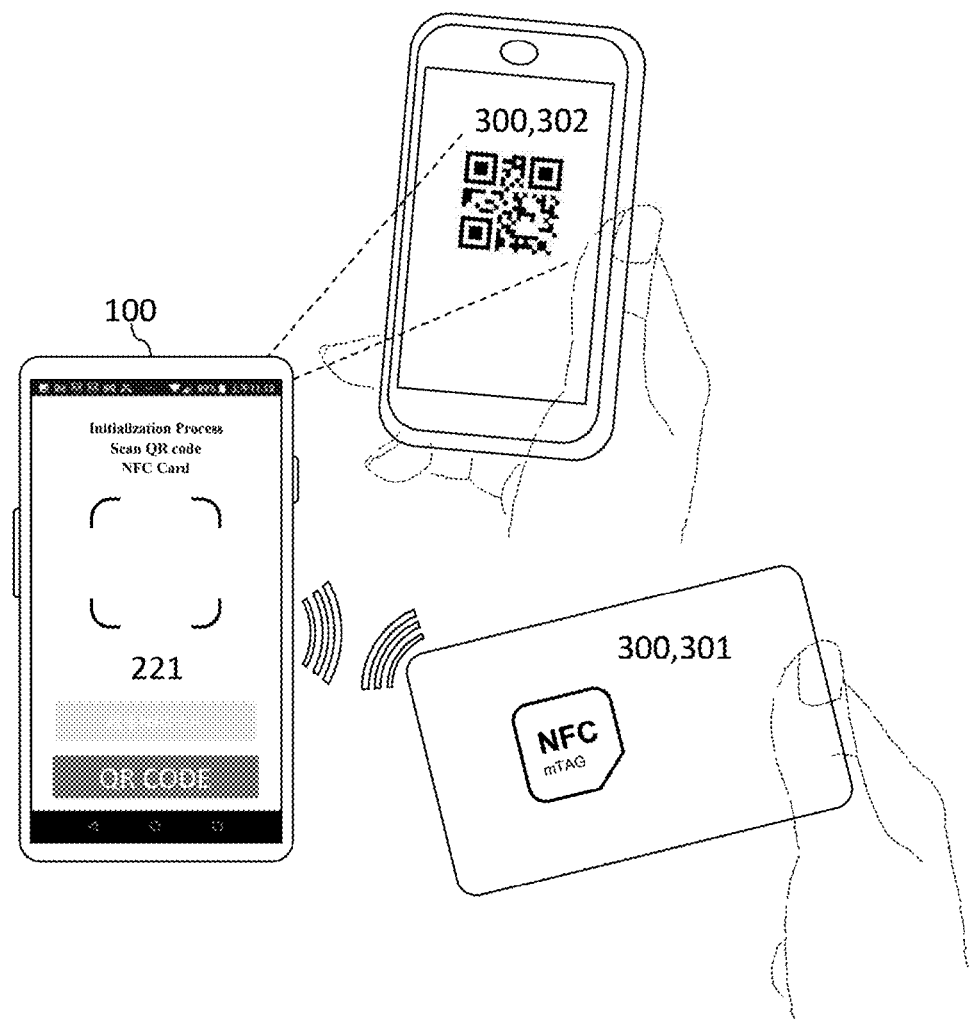
FIG. 4 is a schematic diagram illustrating a first embodiment for the initialization binding operation for binding the physical private key and the authentication information manager device when the authentication information manager computer program product with the physical private key included in the present invention is executed for the first time.

FIG. 4 is a schematic diagram illustrating a first embodiment for the initialization binding operation for binding the physical private key and the authentication information manager device when the authentication information manager computer program product, with the physical private key included, in the present invention is executed for the first time. In the first embodiment, the user must present the physical private key for the authentication information manager computer program product 210 executed on the authentication information manager device 100 through scanning, or other loading means, to perform and complete the initialization binding operation for the authentication information manager computer program product 210.

The form of the physical private key 300 includes but is not limited to one of a physical NFC proximity card 301 and a first two-dimensional code (QR code) 302 presented either on the screen of another mobile phone or as printed on a printing medium. A set of identity information is embedded in the physical private key 300. The physical private key 300 is issued by the product designer of the authentication information manager computer program product 210, such as a developer or a supplier, to a user who has passed the identity check procedure. A user who possesses the physical private key is presumed to be duly and legally authorized to possess the identity and has rights to operate the authentication information manager computer program product 210 based on such identity. The NFC proximity card 301 can either be 1) a passive NFC card with a certain amount of storage for read/write data, or 2) a smart NFC card with an embedded microprocessor that can present read/write data through an encryption protocol or secured by other prevailing means.

The content of the identity information preferably consists of numbers, words, characters, alphabets, symbols, or a combination thereof. In the first embodiment, the identity information is divided into two parts carried by the NFC proximity card 301 and the first QR code 302, respectively. Therefore, in one embodiment, a complete physical private key 300 includes both the NFC proximity card 301 and the first QR code 302. That is, the NFC proximity card 301 and the first QR code 302 contain the fragmented information of the identity information, respectively. During the initialization binding operation of the authentication information manager computer program product 210, the user must present the NFC proximity card 301 and the first QR code 302 to the authentication information manager device 100 and the authentication information manager computer program product 210, respectively, for sensing and scanning to form a complete identity information, and then the initialization binding operation is successfully completed. If the NFC proximity card 301 is lost, the first QR code 302 functions as a temporary credential for identifying the user.

However, in a variable embodiment, the entire physical private key 300 may be only the NFC proximity card 301 or the first QR code 302. In one embodiment, the NFC proximity card 301 or the first QR code 302, respectively, contains the entirety of the identity information. In one embodiment, according to the settings of the authentication information manager computer program product 210, the product designer for the authentication information manager computer program product 210, such as a developer or a supplier, may issue only the NFC proximity card 301 or only the first QR code 302 to the user.

In the first embodiment, when the authentication information manager computer program product 210 is successfully installed on the authentication information manager device 100 and executed for the first time, the authentication information manager computer program product 210 calls and executes the physical private key acquisition module 211, and a physical private key verification interface 221 is displayed on the touch screen of the authentication information manager device 100. The physical private key verification interface 221 displays a prompt notifying the user to provide the physical private key 300 held by the user to the authentication information manager device 100 for scanning or sensing.

When the physical private key 300 is the NFC proximity card 301, the user only needs to bring the NFC proximity card 301 possessed by the user close to the authentication information manager device 100 for the NFC sensor module on the authentication information manager device 100 to sense the NFC proximity card 301. When the physical private key 300 is the first QR code 302, the user only needs to bring his first QR code 302 close to the camera module of the authentication information manager device 100 for the camera module to scan the first QR code 302.

In the first embodiment, the physical private key 300 includes both the NFC proximity card 301 and the first QR code 302. The user first uses the camera module of the authentication information manager device 100 to scan the first QR code 302, and then brings the NFC proximity card 301 close to the authentication information manager device 100 for sensing by the NFC sensing module of the authentication information manager device 100.

When the physical private key acquisition module 211 successfully receives the identity information embedded in a specific physical private key 300 for the first time, it continues to actively bind the identity information to both the authentication information manager device 100 and the authentication information manager computer program product 210 for the initialization binding. Once the identity information is successfully bound to the authentication information manager device 100 and the authentication information manager computer program product 210, it cannot be modified unless the product designer performs the unbinding operation.

In the first embodiment, the physical private key acquisition module 211 automatically combines the first identity information from the first QR code 302 and a second identity information from the NFC proximity card 301 to form an integral identity information. Then, the integral identity information is initially bound to the authentication information manager device 100 and the authentication information manager computer program product 210.

Figure 5:
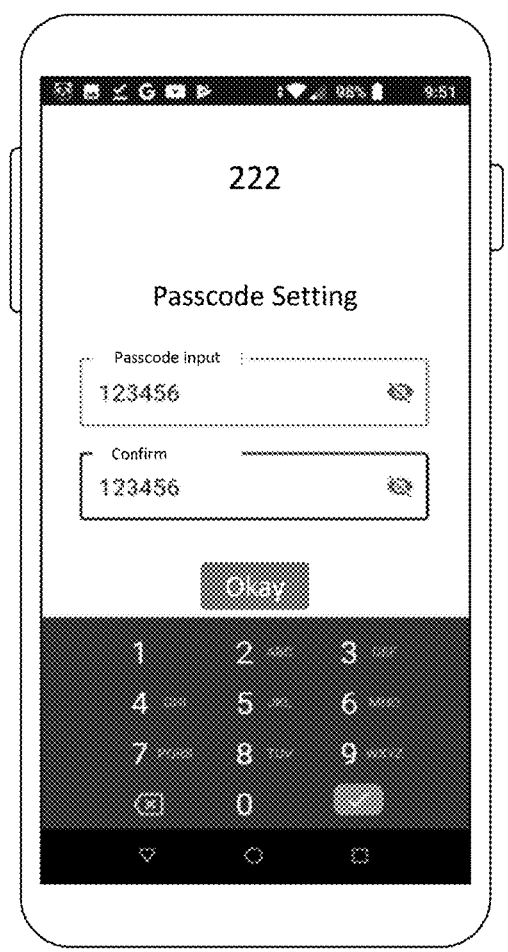
FIG. 5 is a schematic diagram illustrating the passcode setting interface of the authentication information manager computer program product according to the present invention.

FIG. 5 is a schematic diagram illustrating the passcode setting interface of the authentication information manager computer program product according to the present invention. After the identity information is successfully bound to the authentication information manager device 100 and the authentication information manager computer program product 210, the authentication information manager computer program product 210 further displays a passcode setting interface 222 on the touch screen of the authentication information manager device 100. Through the passcode setting interface 222, it notifies the user to input the passcode corresponding to the physical private key 300.

When the user successfully sets the passcode in the passcode setting interface 222, the authentication information manager computer program product 210 immediately binds the passcode to the identity information embedded in the physical private key 300. After the binding of the passcode and the physical private key 300 is completed, the user subsequently only needs to enter the passcode to log in and use the authentication information manager computer program product 210, and the identity information and the passcode form a set of initialization authentication information.

Figure 6:
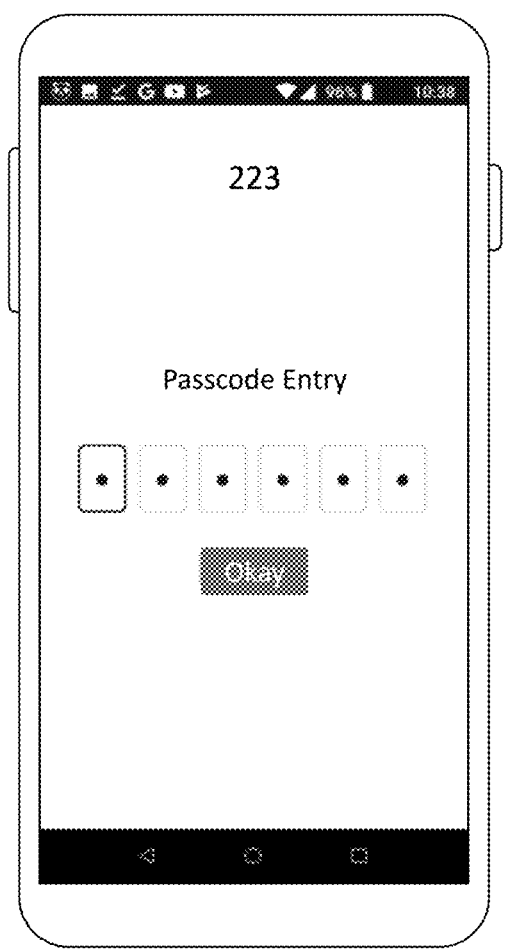
FIG. 6 is a schematic diagram illustrating the passcode input interface of the authentication information manager computer program product according to the present invention.

FIG. 6 is a schematic diagram illustrating the passcode input interface of the authentication information manager computer program product according to the present invention. Whenever the user logs in to use the authentication information manager computer program product 210, the authentication information manager computer program product 210 displays a passcode input interface 223 on the touch screen of the authentication information manager device 100, which requires the user to enter a passcode.

Whenever the user finishes the input of the passcode in the passcode input interface 223, in response to the user's operation, the authentication information manager computer program product 210 calls and executes the multiparty multifactor dynamic strong encryption transmission module 212. Then the multiparty multifactor dynamic strong encryption transmission module 212 is configured to execute a multiparty multifactor dynamic digital authentication method with strong encryption, and two-way transmits/receives a number of encrypted packets formed based on the initialization authentication information including the passcode input by the user and the bound identity information to the authentication information manager backend platform 250 running on the network application serving device 400 for authentication. The multiparty multifactor dynamic digital authentication method with strong encryption is described as follows.

FIG. 7 to FIG. 12 are schematic diagrams illustrating a second embodiment for the initialization binding operation for binding the physical private key and the authentication information manager device when the authentication information manager computer program product without the physical private key included in the present invention is executed for the first time. The second embodiment is based on the first embodiment and comprises all of the technical features in the first embodiment. In the second embodiment, the user does not need to present the physical private key to the authentication information manager computer program product 210. The authentication information manager computer program product 210 generates an identity credential for a specific user, and performs and completes the initialization binding operation for the authentication information manager computer program product 210 based on the identity credential.

When the authentication information manager computer program product 210 is successfully installed in the authentication information manager device 100 and executed for the first time, the passcode setting interface 222, as shown in FIG. 5, is displayed on the touch screen of the authentication information manager device 100, which is provided for the user to set the passcode through the passcode setting interface 222.

Figure 7:
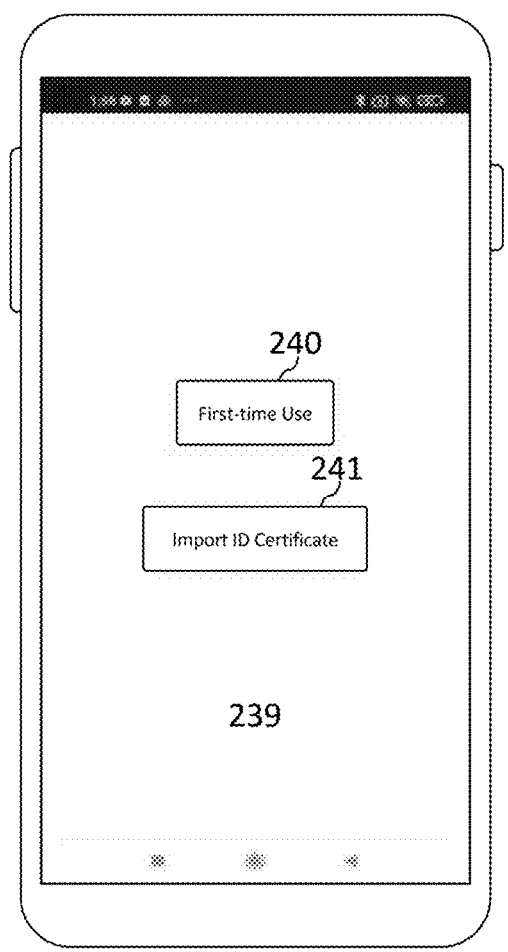
FIG. 7 is a schematic diagram illustrating the identity credential management interface for the authentication information manager computer program product according to the present invention.

FIG. 7 is a schematic diagram illustrating the identity credential management interface for the authentication information manager computer program product according to the present invention. When the user successfully sets the passcode in the passcode setting interface 222, the authentication information manager computer program product 210 calls and executes an identity credential management module 216 in response to the user's operation. The identity credential management module 216 shows an identity credential management interface 239 on the touch screen of the authentication information manager device 100.

When the user is using for the first time, the user must click the first-time use button 240 included in the identity credential management interface 239 to instruct the authentication information manager computer program product 210 to generate an identity credential. When the user already has an identity credential, the user needs to click the import identity credential button 241 included in the identity credential management interface 239 to import the user's own identity credential into the authentication information manager computer program product 210 for identity verification. The contents of the identity credential includes a third identity information, and the third identity information is a complete set of identity information.

Figure 8:
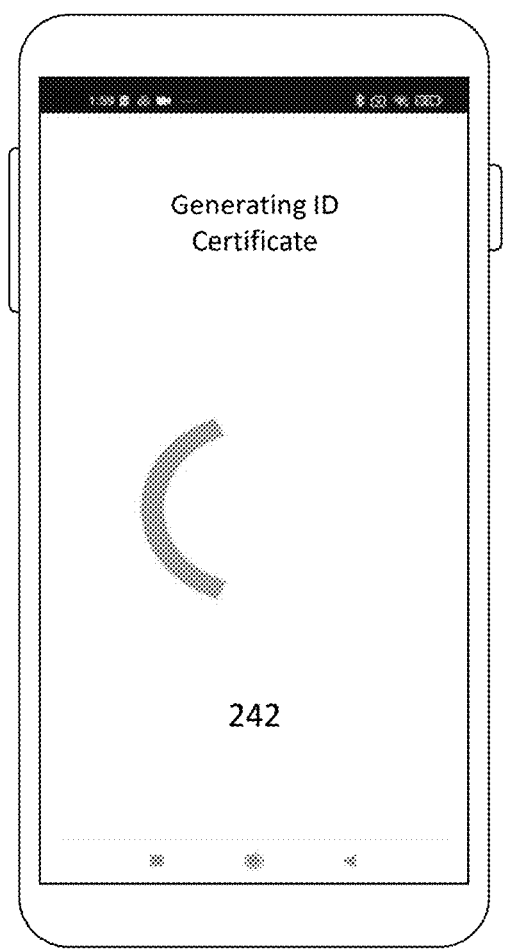
FIG. 8 is a schematic diagram illustrating the identity credential generation operation prompt interface included in the authentication information manager computer program product according to the present invention.
Figure 9:
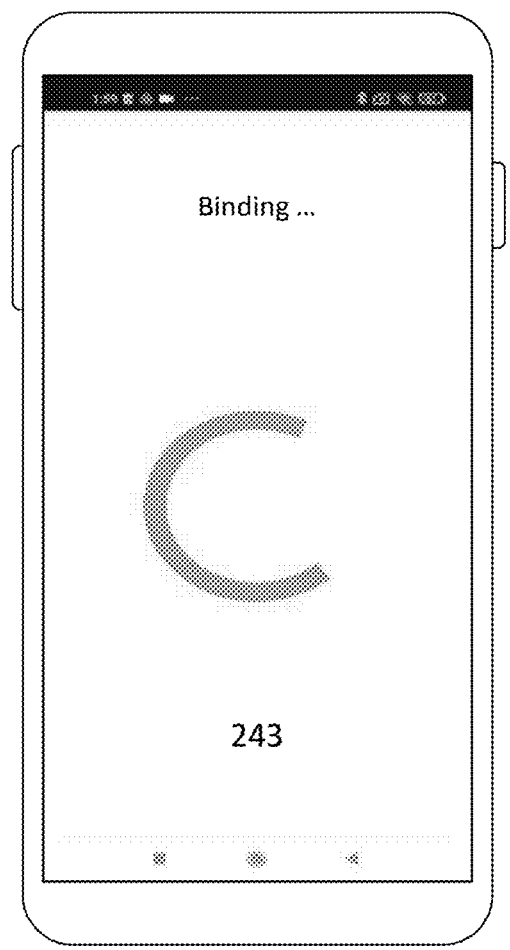
FIG. 9 is a schematic diagram illustrating the initialization binding operation prompt interface for the authentication information manager device included in the authentication information manager computer program product according to the present invention.

FIG. 8 is a schematic diagram illustrating the identity credential generation operation prompt interface included in the authentication information manager computer program product according to the present invention. FIG. 9 is a schematic diagram illustrating the initialization binding operation prompt interface for the authentication information manager device included in the authentication information manager computer program product according to the present invention. In one embodiment, it is described as an example when the user is using for the first time. After the user clicks the first-time use button 240 included in the identity credential management interface 239, the authentication information manager computer program product 210 starts to generate a unique identity credential dedicated to a specific user, optionally based on the IMEI code, the MAC address, or the mobile phone number, and to initialize the binding between the identity information included in the identity credential and the authentication information manager device 100. During the execution of the initialization binding operation, the identity credential generation operation prompt interface 242 and the initialization binding operation prompt interface 243 of the authentication information management device are displayed on the touch screen of the authentication information manager device 100, respectively.

Figure 10:
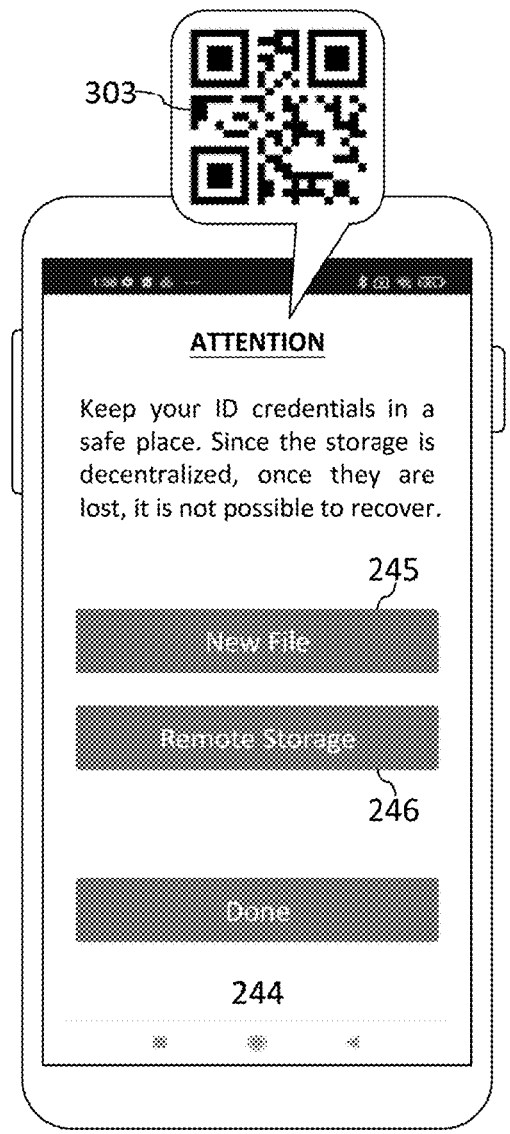
FIG. 10 is a schematic diagram illustrating the identity credential notification and transfer interface included in the authentication information manager computer program product according to the present invention.

FIG. 10 is a schematic diagram illustrating the identity credential notification and transfer interface included in the authentication information manager computer program product according to the present invention. After the generation and initialization binding operation for the identity credential is completed, the identity credential management module 216 displays the identity credential notification and transfer interface 244 on the touch screen of the authentication information manager device 100 to notify the user that the identity credential has been created and to transfer the created identity credential to the user for storage. In one embodiment, the created identity credential is presented in the form of the second QR code 303 and is generated as an image file that is convenient for the user to store. The content of the second QR code 303 includes a complete set of identity information.

Figure 11:
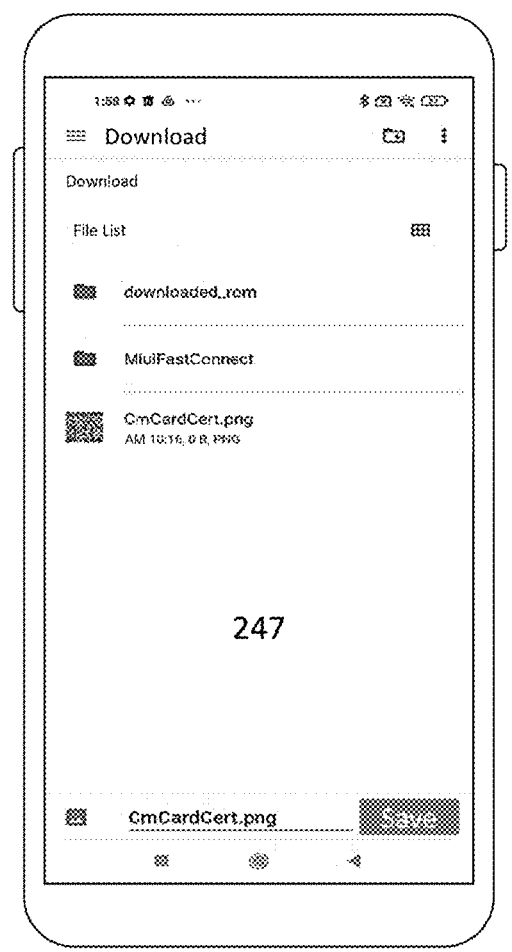
FIG. 11 is a schematic diagram illustrating the identity credential local storage interface included in the authentication information manager computer program product according to the present invention.

FIG. 11 is a schematic diagram illustrating the identity credential local storage interface included in the authentication information manager computer program product according to the present invention. The identity credential notification and delivery interface 244 includes a save as new file button 245 and a remote storage button 246. When the user wants to save the identity credential in the storage medium directly to the authentication information manager device 100, the user selects to click the save as a new file button 245, and then the identity credential management module 216 performs the local storage operation. Then, the identity credential local storage interface 247 is displayed on the touch screen of the authentication information manager device 100 for the user to operate so as to directly save the identity credential in the authentication information manager device 100 locally.

Figure 12:
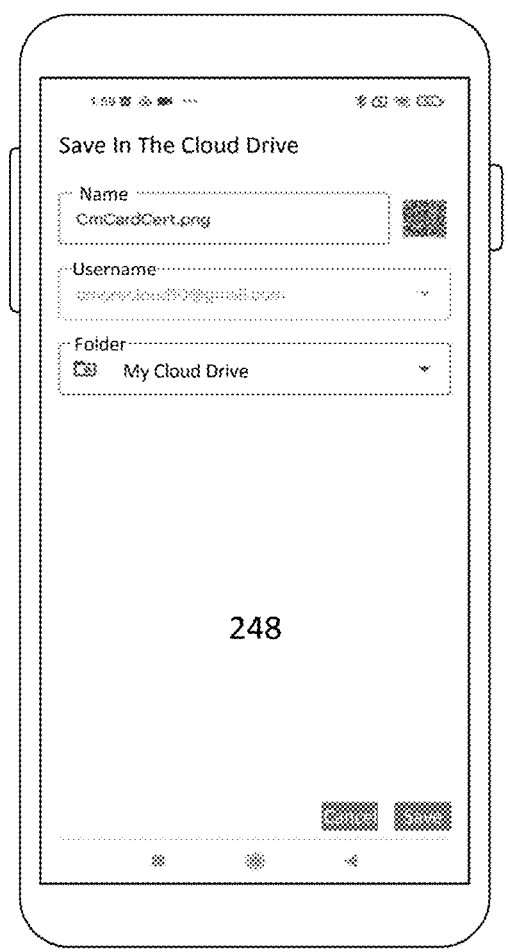
FIG. 12 is a schematic diagram illustrating the identity credential remote storage interface included in the authentication information manager computer program product according to the present invention.

FIG. 12 is a schematic diagram illustrating the identity credential remote storage interface included in the authentication information manager computer program product according to the present invention. When the user wants to save the identity credential in a third-party storage media other than the authentication information manager device 100, the user selects to click the remote storage button 246, and then the identity credential management module 216 performs the remote storage operation. The identity credential remote storage interface 248 is displayed on the touch screen of the authentication information manager device 100 for the user to operate to store the identity credential in a third-party storage medium.

In the second embodiment, the initialization authentication information includes all of or a part of the identity credential. When the initialization authentication information is successfully generated, the authentication information manager computer program product 210 calls and executes the multiparty multifactor dynamic strong encryption transmission module 212, in response to the user's operation. The multiparty multifactor dynamic strong encryption transmission module 212 is configured execute the multiparty multifactor dynamic digital authentication method with strong encryption, and transmit encrypted or, more broadly speaking, transfigurated packets formed based on the initialization authentication information including the passcode entered by the user with the bound identity information to the authentication information manager backend platform 250 in the network application serving device 400 for authentication.

The acts of "transfigurating", "transfigurated" and "transfiguration", referred heretofore, denote any form and method of "code transformation" including, for example, encryption, hashing, mapping a private key to a public key, mapping a BigInteger number to a digital signature, Lattice Multiplication, encoding with Error Correcting Codes, an arbitrarily defined one-way function, and so on.

In the second embodiment, the third identity information included in the second QR code 303 is substantially the combination of both the first identity information included in the first QR code 302 and the second identity information included in the NFC proximity card 301 described in the first embodiment. That is, the third identity information includes the first identity information and the second identity information.

The authentication information manager computer program product 210 described and included in the aforementioned first and second embodiments refers to the same computer program product or to two different computer program products that are independent of each other. For example, the first embodiment and the second embodiment may be implemented by the same third computer program product, but the first embodiment and the second embodiment may also be implemented by the first computer program product and the second computer program product, respectively. The first computer program product and the second computer program product are different products and must be separately downloaded and installed on the authentication information manager device 100.

Figure 13:
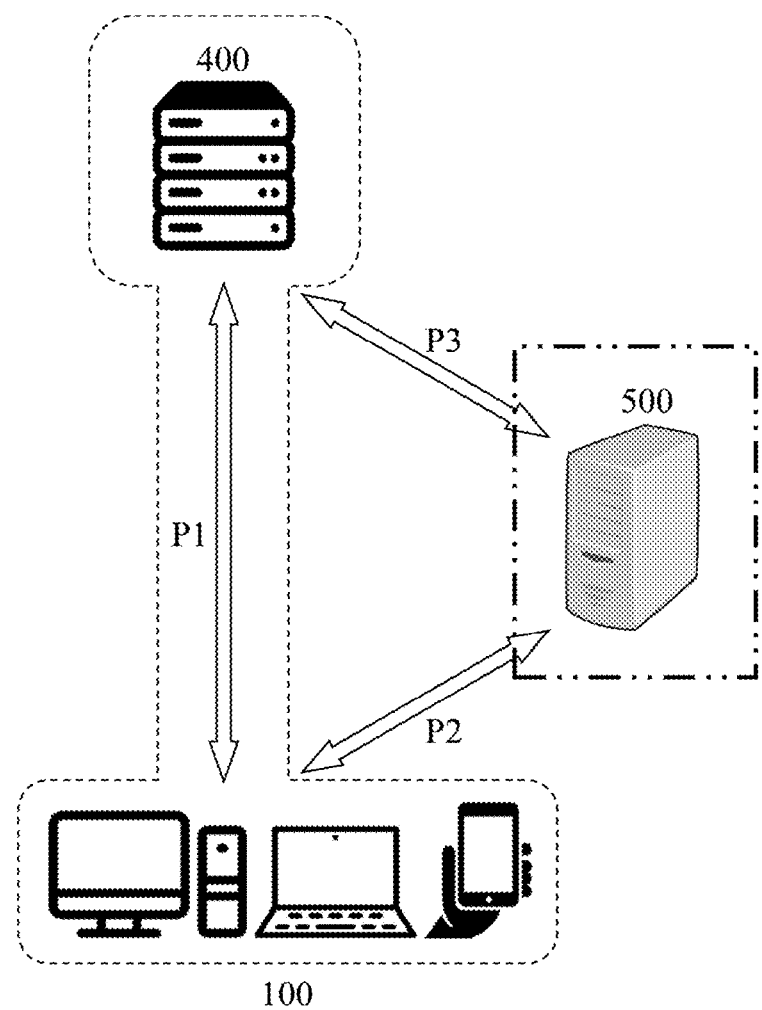
FIG. 13 is a schematic diagram illustrating the systematic architecture for implementing the multiparty multifactor dynamic digital authentication method with strong encryption according to the present invention.

FIG. 13 is a schematic diagram illustrating the systematic architecture for implementing the multiparty multifactor dynamic digital authentication method with strong encryption according to the present invention. The multiparty multifactor dynamic digital authentication method with strong encryption according to the present invention involves at least three devices, including the authentication information manager device 100 operated by the user, the network application serving device 400, and the third-party security serving equipment 500. These three devices establish a transmission connection with each other through the network 20 including an Internet or an Intranet, so as to exchange messages and information, etc. The network application serving device 400 further includes a second security intermediary program, and the third-party security serving equipment 500 further includes a third security intermediary program.

The authentication information manager device 100 preferably establishes the communication connection with the network application serving device 400 through a transmission connection P1, and establishes the communication connection with the third-party security serving equipment 500 through a second transmission connection P2. The communication connection between the network application serving device 400 and the third-party security serving equipment 500 is established through a third transmission connection P3. The first transmission connection P1, the second transmission connection P2, and the third transmission connection P3 may be unencrypted, insecure, or untrusted connections. In one embodiment, the first transmission connection P1 preferably uses an out-of-band channel.

In addition to the first transmission connection P1, the authentication information manager device 100 and the network application serving device 400 used in the prior art, the multiparty multifactor dynamic digital authentication method with strong encryption according to the present invention further adds the third-party security serving equipment 500 operated by an independent third party. It further adds the second transmission connection P2 connecting the authentication information manager device 100 and the third-party security serving equipment 500, and the third transmission connection P3 connecting the network application serving device 400 and the third-party security serving equipment 500.

Figure 14:
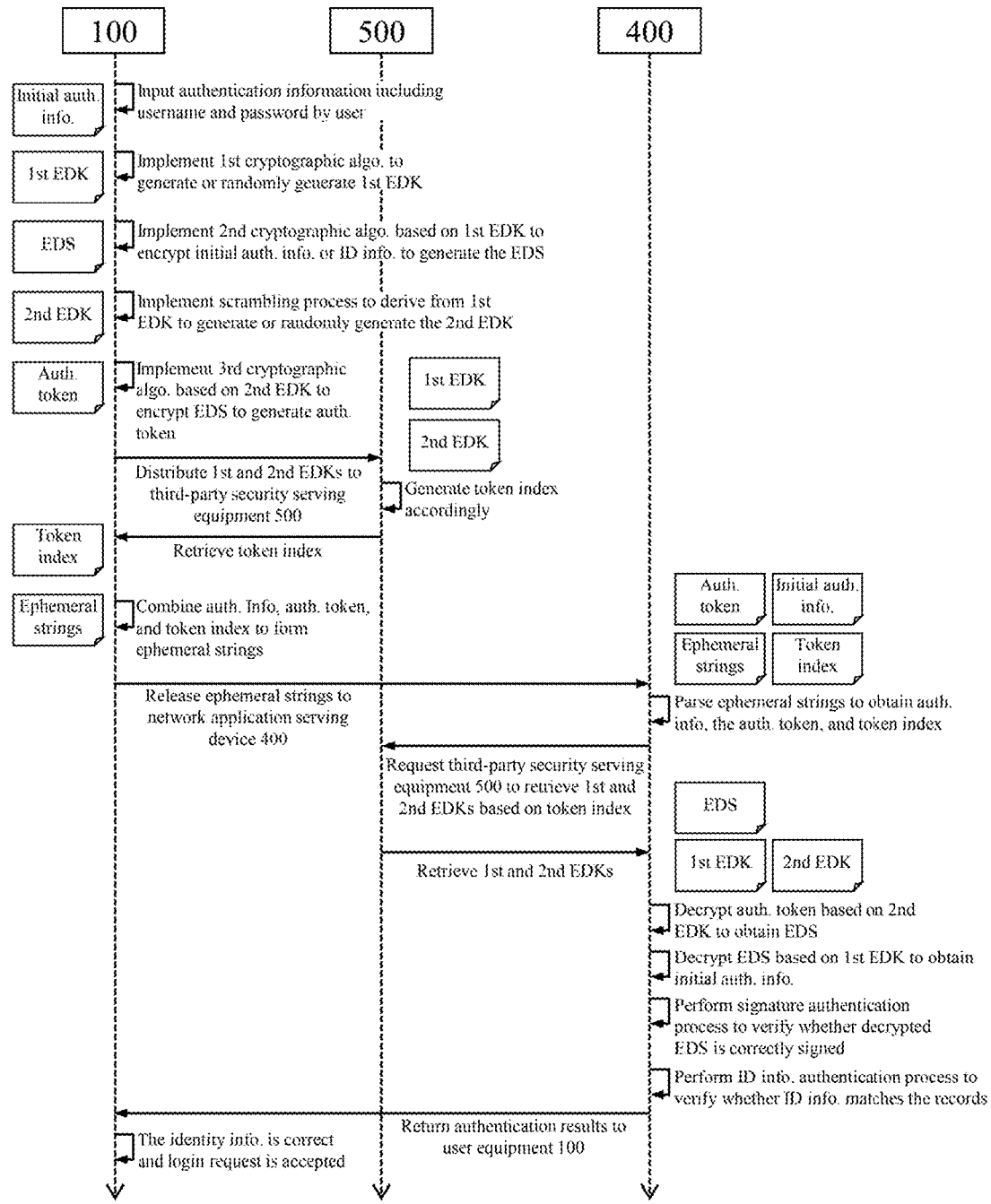
FIG. 14 is a sequence diagram illustrating the implementation processes for the multiparty multifactor dynamic digital authentication method with strong encryption according to the present invention.

FIG. 14 is a sequence diagram illustrating the implementation processes for the multiparty multifactor dynamic digital authentication method with strong encryption according to the present invention. First of all, the user inputs the owned initialization authentication information into the authentication information manager device 100. When the authentication information manager computer program product 210 detects the above login operation, in response to the input of the initialization authentication information, the authentication information manager computer program product 210 calls and activates the multiparty multifactor dynamic strong encryption transmission module 212.

After execution, the multiparty multifactor dynamic strong encryption transmission module 212 is configured to use the initialization authentication information input by the user as the seed value, and to perform the first cryptographic algorithm in the authentication information manager device 100, to generate a set of a first ephemeral decryption key (1st EDK) having a length of, for example, 32 bytes. Alternatively, the multiparty multifactor dynamic strong encryption transmission module 212 may perform the first cryptographic algorithm based on a randomly generated seed value to generate the first ephemeral decryption key. Alternatively, the multiparty multifactor dynamic strong encryption transmission module 212 may randomly generate the first ephemeral decryption key.

The first cryptographic algorithm is preferably selected from the RSA algorithm, the DSA algorithm, the MD5 algorithm, the MD4 algorithm, the MD2 algorithm, the SHA-1 algorithm, the SHA-2 algorithm, the SHA-3 algorithm, the RIPEMD-160 algorithm, the MDC-2 algorithm, the GOST R 34.11-94 algorithm, the BLAKE2 algorithm, the Whirlpool algorithm, the SM3 algorithm and a combination thereof. The first cryptographic algorithm is preferably used to generate a first ephemeral decryption key, also known as a key generation algorithm, an encryption key generation algorithm, or a hash algorithm.

After the first ephemeral decryption key is generated in the authentication information manager device 100, the multiparty multifactor dynamic strong encryption transmission module 212 continues to perform a second cryptographic algorithm based on the first ephemeral decryption key in the authentication information manager device 100, to encrypt the initialization authentication information or the identity information (ID info.), either the third identity information, so to generate an electronic digital signature (EDS). The second cryptographic algorithm is preferably selected from the RSA algorithm, the DSA algorithm, the ECDSA algorithm, the ECC algorithm, the HMAC algorithm, the MD5 algorithm, the MD4 algorithm, the MD2 algorithm, the SHA-1 algorithm, the SHA-2 algorithm, the SHA-3 algorithm, the RIPEMD-160 algorithm, the MDC-2 algorithm, the GOST R 34.11-94 algorithm, the BLAKE2 algorithm, the Whirlpool algorithm, the SM3 algorithm and a combination thereof. The second cryptographic algorithm is preferably used to generate the electronic digital signature.

After the electronic digital signature is generated in the authentication information manager device 100, the multiparty multifactor dynamic strong encryption transmission module 212 continues to perform a scrambling procedure. Based on the first ephemeral decryption key, the scrambling procedure varies the first ephemeral decryption key to form a second ephemeral decryption key (2nd EDK). Alternatively, the multiparty multifactor dynamic strong encryption transmission module 212 may randomly generate the second ephemeral decryption key.

After the second ephemeral decryption key is generated in the authentication information manager device 100, the multiparty multifactor dynamic strong encryption transmission module 212 continues to perform the third cryptographic algorithm based on the second ephemeral decryption key in the authentication information manager device 100, to further encrypt the electronic digital signatures to generate an authentication token. The third cryptographic algorithm is preferably selected from the AES algorithm, the RSA algorithm, the DSA algorithm, the HMAC algorithm, the MD5 algorithm, the MD4 algorithm, the MD2 algorithm, the SHA-1 algorithm, the SHA-2 algorithm, the SHA-3 algorithm, the Blowfish algorithm, the Camellia algorithm, the Chacha20 algorithm, the Poly1305 algorithm, the SEED algorithm, the CAST-128 algorithm, the DES algorithm, the IDEA algorithm, the RC2 algorithm, the RC4 algorithm, the RC5 algorithm, the SM4 algorithm, the TDES algorithm and the GOST 28147-89 algorithm and a combination thereof. The third cryptographic algorithm is also known as a security encryption algorithm, and preferably a symmetric-key encryption algorithm.

Next, the multiparty multifactor dynamic strong encryption transmission module 212 is configured to distribute the generated first and second ephemeral decryption keys from the authentication information manager device 100 to the third-party security serving equipment 500 via the second transmission connection P2, preferably transmitted under strong encryption. Such strong encryption mode can be, for example, afforded by TLS/SSL encryption, preferably further double-encrypted by Identity-based Encryption stemming from the initialization authentication information of the authentication information manager device 100. Then, the third security intermediary program running in the third-party security serving equipment 500 is configured to generate a key index according to the first and second ephemeral decryption keys.

The key index refers to a minimum content, or a strictly smaller portion, sufficient to extract the information regarding the first and second ephemeral decryption keys. Next, the authentication information manager device 100 is configured to request the third-party security serving device 500 to retrieve the key index, preferably transmitted under strong encryption. Such strong encryption mode can be, for example, afforded by TLS/SSL encryption, preferably further double-encrypted by Identity-based Encryption stemming from the initialization authentication information of the authentication information manager device 100. The first and second ephemeral decryption keys have a form including but not limited to, a symbolic string having a length of 256 binary bits or a QR code.

Next, the multiparty multifactor dynamic strong encryption transmission module 212 is configured to combine the initialization authentication information input by the user, the generated authentication token and the retrieved key index to form a set of ephemeral string. Then, the formed ephemeral string is distributed from the authentication information manager device 100 to the network application serving device 400.

In the network application serving device 400, after the second security intermediary program installed on the network application serving device 400 receives the ephemeral string, it is configured to parse the ephemeral string, so as to obtain the authentication information from the ephemeral string, including the initialization authentication information, the key index and the authentication token. The parsing process preferably does not involve the encryption and decryption computations. Then, the obtained key index is transmitted to the third-party security serving equipment 500 preferably under an encrypted mode or, less preferably, under an unencrypted mode, to request the third-party security serving equipment 500 to retrieve the corresponding first and second ephemeral decryption keys stored in the third-party security serving equipment 500 based on the key index. The encrypted mode can be, for example, afforded by TLS/SSL encryption, preferably further double-encrypted by Identity-based Encryption stemming from the initialization authentication information of the network application serving device 400.

Then, in the network application serving device 400, the second security intermediary program is configured to execute the third cryptographic algorithm based on the received second ephemeral decryption key to decrypt the authentication token into the electronic digital signature, and to execute a digital signature verification process to verify whether the electronic digital signature is correctly signed. If it is confirmed that the electronic digital signature is correctly signed, the second security intermediary program is further configured to execute the second cryptographic algorithm based on the received first ephemeral decryption key to decrypt the electronic digital signature to obtain the initialization authentication information, and to execute the initialization authentication information verification process on the obtained initialization authentication information to verify whether the identity information and the passcode are correctly matched to the respective records.

After the signature verification process and the initialization authentication information verification process are performed, the network application serving device 400 is configured to return the verification results to the authentication information manager device 100. Only if the signature verification process and the initialization authentication information verification process are correct, the login request is allowed and the user is allowed to log in and access the application service via the authentication information manager device 100, and access the application service on the network application serving device 400. Otherwise, the user is denied login to the application service.

After all of the verification processes are performed, the first and second ephemeral decryption keys temporarily stored in the authentication information manager device 100, the network application serving device 400 and the third-party security serving equipment 500, and the initialization authentication information, the electronic digital signature, the authentication token, the ephemeral string and the key index temporarily stored in the authentication information manager device 100 and the network application serving device 400 are automatically deleted.

In one embodiment, the third cryptographic algorithm is executed in the authentication information manager device 100 and the network application serving device 400, but not in the third-party security serving equipment 500 such that one can realize the beneficial effects, for example cloud off-loading, of edge computing. And the passcode is only temporarily stored in the authentication information manager device 100 and the network application serving device 400, not in the third-party security serving equipment 500. In addition, only the first and second ephemeral decryption keys are temporarily stored in the third-party security serving equipment 500, and the initialization authentication information is not transmitted to the third-party security serving equipment 500 that is considered to be operating under higher cyber security exposure and risks.

FIG. 15 is the first operational schematic diagram illustrating the authentication information management interface for the authentication information manager computer program product according to the present invention. After the user successfully logs into the authentication information manager computer program product 210, in response to the user's operation, the authentication information management module 213 is configured to display an authentication information management interface 224 on the touch screen, if so equipped, of the authentication information manager device 100. The authentication information management interface 224 includes a management item directory 225 and an "Add New (+)" button 226. The management item directory 225 demonstrates to the user the multiple networking applications with the authentication information that have been established and managed, using a list with the names of the networking applications as the item titles.

Each set of authentication information includes at least a username and a password that are used to enter a front-end interface provided by a particular networking application to log in to a particular networking application, such as but not limited to Netflix, Facebook, shopee and so on. The form of the front-end interface includes, but is not limited to, an application program executed on a mobile device, a web-based network service page executed by a browser included in a mobile device, an application program executed on a notebook computer, or web-based network service page executed by a browser included in a notebook computer.

FIG. 16 is a schematic diagram illustrating the authentication information editing window in the authentication information management interface of the authentication information manager computer program product according to the present invention. The user can click an information button 227 at the right side in a particular web application item listed in the management item directory 225. After clicking the information button 227, a drop down menu is popped up. The user can further click a detailed information button 228 displayed in the drop down menu. In response to the user's operation, the authentication information management module 213 is configured to further generate an authentication information editing window 229 and overlay it on the original authentication information management interface 224.

The authentication information editing window 229 includes at least the following fields: a networking application title field 230, a username field 231, and a password field 232, etc., and allows the user to edit the contents of these fields. By operating the authentication information editing window 229 and inputting relevant information into the corresponding fields, the user can input any authentication information for a networking application and bring the networking application under management.

For example, in one embodiment, when the user wants to manage the networking application of Netflix and the corresponding authentication information, the user enters the authentication information, such as the username and password, required to log in to Netflix into the authentication information manager computer program product 210. By simply operating the authentication information editing window 229, the user can easily take the networking application Netflix and the corresponding authentication information under management by using the authentication information manager computer program product 210.

The authentication information manager computer program product 210 is further configured to provision a strong password to the user by the strong password generation module 214. In general, a strong password refers to a password with sufficiently long characters, random arrangement, and nested arrangement of various symbols, which is considered more difficult to crack. The user can click the strong password button 233 shown in the authentication information editing window 229. In response to the user's operation, the authentication information manager computer program product 210 is configured to execute the strong password generation module 214 to automatically generate a strong password, or a few candidates of such to be selected, to fill into the password field 232, and to overwrite the original password.

When the user chooses to manage the owned authentication information for networking applications by the authentication information manager computer program product 210 according to the present invention, since all the authentication information that the user has is already stored/recorded in the authentication information manager computer program product 210, the user only needs to memorize the passcode for logging in to the authentication information manager computer program product 210, in order to log in to all the owned networking (or even those non-networked) applications by using and operating the authentication information manager computer program product 210, instead of memorizing all the authentication information for each networking application. In this scenario, there is no need for the user to memorize any password for each owned networking application, and the user can replace each originally weak password with a strong password generated by the authentication information manager computer program product 210 to attain better information security protection effect.

The authentication information management module 213 allows the user to manage multiple sets of authentication information for a multitude of networking applications. When the user needs to add a new authentication information for a new networking application, the user only needs to click the "Add New (+)" button 226 displayed in the authentication information management interface 224, as shown in FIG. 15. In response to the user's operation, the authentication information management module 213 further generates an empty authentication information editing window 229 and overlays it on the original authentication information management interface 224, which is for the user to edit the authentication information for the networking application item, and to create a new networking application item and the corresponding authentication information.

Figure 17:
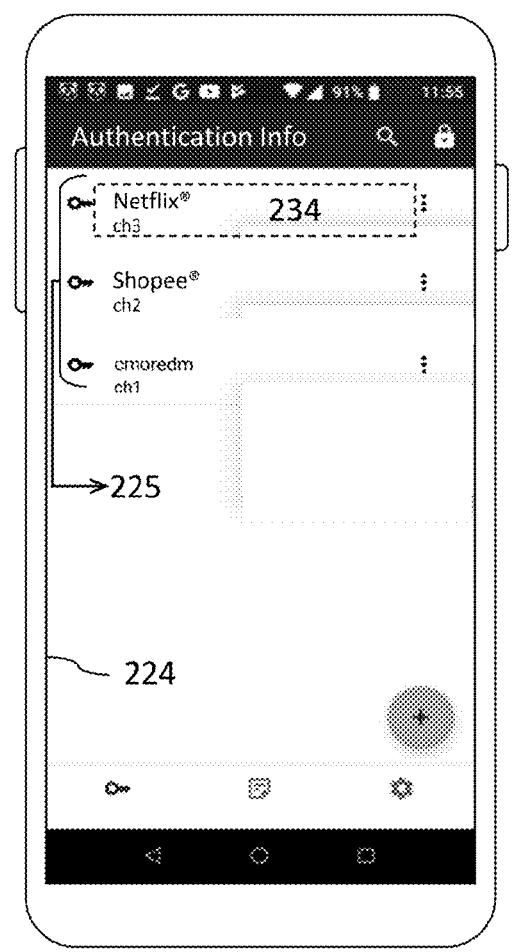
FIG. 17 is the second operation schematic diagram illustrating the authentication information management interface for the authentication information manager computer program product according to the present invention.

FIG. 17 is the second operation schematic diagram illustrating the authentication information management interface for the authentication information manager computer program product according to the present invention. After the user establishes all the networking application items demanded to be managed in the authentication information management interface 224, the user may choose to directly click a particular networking application item in the authentication information management interface 224. In one embodiment, the user directly clicks the Netflix networking application item 234 shown in the management item directory 225. At this time, the authentication information manager computer program product 210 is configured to call and execute the autofill module 215, and the Netflix application 235 installed on the authentication information manager device 100 is launched and activated.

Figure 18:
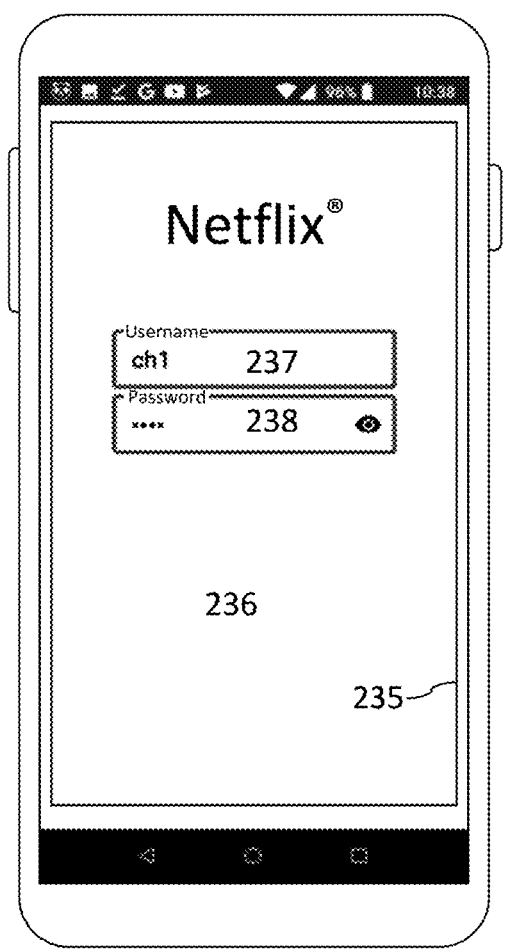
FIG. 18 is an operation schematic diagram illustrating the autofill function automatically performed by the authentication information manager computer program product according to the present invention.

FIG. 18 is an operation schematic diagram illustrating the autofill function automatically performed by the authentication information manager computer program product according to the present invention. After the Netflix application 235 is successfully activated and the login page 236 is entered, the autofill module 215 automatically enters the authentication information for the Netflix networking application, including the username and password required for logging into the Netflix networking application, into the authentication information entry fields in the login page 236. The authentication information entry fields include at least the username field 237 and the password field 238.

When the authentication information manager computer program product 210 is initially installed on the authentication information manager device 100, during the installation process, it has obtained from the operating system (OS) the control right to open the front-end interface of the networking application, and the control right to automatically fill the authentication information into the corresponding field of the login page of the front-end interface. These control rights are transferred to the autofill module 215 for execution.

The authentication information manager computer program product proposed by the present invention has the following main features: (1) Superior security: it operates a quantum-safe grade of strong encryption for account and password management and cold wallet function; (2) Secure storage: it has the ability to securely store personal account information, credit card information, and digital assets such as mnemonic phrases for virtual currency or NFTs; (3) Main feature: it ensures payment security and protects against online fraud; and (4) User-friendliness: its user interface is well designed with simplicity, ease of use, portability, and plug-and-play in mind, which allows users to apply complex password effortlessly.

Furthermore, the present invention introduces a novel multi-factor authentication (MFA) encryption method to transmit the user's dynamic authentication credential(s), which attains quantum-safe high security level for information security protection. There is no cloud backdoor for hackers to crack. It integrates biometric protection such as facial recognition and fingerprint recognition on smartphones, and it also allows the user to customize own PIN code. It is applicable to various devices such as Android mobile phone, iOS mobile phone, WinOS PC or MacOS PC. No RFID reader is required for the PC version. The invention includes a simple and secure information retrieval mechanism that ensures easy retrieval of information in case of QR code/ID loss, NFC card loss, or phone loss.

There are further embodiments provided as follows.

Embodiment 1: An authentication information manager computer program product, which is embodied on a non-transitory computer-readable storage medium and loaded and executed by a processor unit included in a user equipment, includes: a computer code of a physical private key acquisition module configured to receive identity information from a physical private key and receive a passcode to form an initialization authentication information including a part of the passcode and a part of the identity information; a computer code of an authentication information management module configured to record a first set of authentication information for logging in to a first networking application; a computer code of a multiparty multifactor dynamic strong encryption transmission module configured to transmit the transfigurated initialization authentication information to a network application serving device including an authentication information manager backend platform and a third-party security serving equipment for verification by implementing a multiparty multifactor dynamic strong encryption authentication method.

Embodiment 2: The authentication information manager computer program product as described in Embodiment 1, further includes one of: a computer code of an autofill module configured to open a front-end interface of the first networking application and automatically fill in the first set of authentication information into a first authentication information entry field included in the front-end interface, in response to an operation from a user; and a computer code of a strong password generation module configured to automatically generate a strong password and assign the strong password as a password included in the first set of authentication information.

Embodiment 3: The authentication information manager computer program product as described in Embodiment 2, the first networking application provides an application program running on the user equipment or a web-based network service page executed by a browser as the front-end interface for the user to enter the first set of authentication information, and the first set of authentication information at least includes a username and a password.

Embodiment 4: The authentication information manager computer program product as described in Embodiment 1, the multiparty multifactor dynamic digital authentication method with strong encryption further includes one of: on the user equipment: randomly generating at least one ephemeral decryption key upon receiving the initialization authentication information, wherein the initialization authentication information at least comprises the passcode and the identity information; transmitting the at least one ephemeral decryption key to the third-party security serving equipment and retrieving a token index from the third-party security serving equipment accordingly; encrypting the initialization authentication information or the identity information to generate an electronic digital signature based on a part of the at least one ephemeral decryption key to generate an authentication token; and combining the first set of authentication information, the identity information, the token index, and the authentication token selectively to form an ephemeral string and transmitting the ephemeral string to the network application serving device; and on the network application serving device: receiving and parsing the ephemeral string to acquire the first set of authentication information, the identity information, the token index, and the authentication token; requesting to retrieve the at least one ephemeral decryption key from the third-party security serving equipment based on the token index; and decrypting the authentication token based on a part of the at least one ephemeral decryption key to acquire and verify the electronic digital signature; decrypting the electronic digital signature based on a part of the at least one ephemeral decryption key to acquire the initialization authentication information.

Embodiment 5: The authentication information manager computer program product as described in Embodiment 4, the multiparty multifactor dynamic digital authentication method with strong encryption further includes one of: on the network application serving device: implementing a signature verification process to verify whether the electronic digital signature is correctly signed; implementing an initialization authentication information verification process to verify whether the passcode and the identity information are correctly matched to the respective records; and when one of the verification results of the initialization authentication information verification process and the signature verification process are positive, the user is accepted to log in to the authentication information manager backend platform, otherwise, the user is rejected the access to the authentication information manager backend platform.

Embodiment 6: The authentication information manager computer program product as described in Embodiment 1, the physical private key is one of an NFC card and a QR code, and the user equipment is a smartphone, a tablet device, a laptop computer, a notebook computer or a desktop computer. Said NFC card can be either a passive NFC storage or a smart NFC interface with embedded microprocessor.

Embodiment 7: The authentication information manager computer program product as described in Embodiment 1, the authentication information manager computer program product is an application program running on the user equipment or a web-based network service page running on a browser on the user equipment.

Embodiment 8: An authentication information manager computer program product, which is embodied on a non-transitory computer-readable storage medium and loaded and executed by a processor unit included in a user equipment, includes: a computer code of an identity credential management module configured to receive a passcode and generate an identity credential to form an initialization authentication information including a part of the passcode and a part of the identity credential; a computer code of an authentication information management module configured to record a first set of authentication information for logging in to a first networking application; and a computer code of a multiparty multifactor dynamic strong encryption transmission module configured to transmit the transfigurated initialization authentication information to a network application serving device including an authentication information manager backend platform and a third-party security serving equipment for verification thus implementing a multiparty multifactor dynamic digital authentication method with strong encryption.

Embodiment 9: An authentication information manager device includes modules executed by a processor unit as follows: a physical private key acquisition module configured to receive identity information from a physical private key and receive a passcode to form an initialization authentication information including a part of the passcode and a part of the identity information; an authentication information management module configured to record a first set of authentication information for logging in to a first networking application; and a multiparty multifactor dynamic strong encryption transmission module configured to transmit the transfigurated initialization authentication information to a network application serving device including an authentication information manager backend platform and a third-party security serving equipment for verification thus implementing a multiparty multifactor dynamic digital authentication method with strong encryption.

Embodiment 10: An authentication information manager device includes modules executed by a processor unit as follows: an identity credential management module configured to receive a passcode and generate an identity credential to form an initialization authentication information including a part of the passcode and a part of the identity credential; an authentication information management module configured to record a first set of authentication information for logging in to a first networking application; and a multiparty multifactor dynamic strong encryption transmission module configured to transmit the transfigurated initialization authentication information to a network application serving device including an authentication information manager backend platform and a third-party security serving equipment for verification thus implementing a multiparty multifactor dynamic digital authentication method with strong encryption.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An authentication information manager method, comprising:
   by a computer code of a physical private key acquisition module installed in a user equipment, receiving an identity information from a physical private key and a passcode to form an initialization authentication information comprising a part of the passcode and a part of the identity information;
   by a computer code of an authentication information management module installed in the user equipment, recording a first set of authentication information for logging in to a first networking application;
   by a computer code of a mapping node authentication module installed in the user equipment, transmitting the initialization authentication information to a network application serving device comprising an authentication information manager backend platform and a third-party mapping node for verification by initiating a mapping node authentication method, wherein the mapping node authentication method comprises:
   randomly generating at least one ephemeral decryption key upon receiving the initialization authentication information at the user equipment;
   performing a third-party mapping process, wherein the third-party mapping process comprises:
   transmitting the at least one ephemeral decryption key from the user equipment to the third-party mapping node;
   correspondingly generating a key index based on the at least one ephemeral decryption key by the third-party mapping node;
   returning the key index from the third-party mapping node to the user equipment;
   transmitting the key index from the user equipment to the network application serving device; and
   requesting the third-party mapping node to retrieve the key index from the network application serving device based on the key index,
   wherein the key index refers to a strictly smaller portion that sufficient to extract the at least one ephemeral decryption key.

2. The authentication information manager method as claimed in claim 1, further comprising one of:
   by a computer code of an autofill module installed in the user equipment, opening a front-end interface of the first networking application and automatically filling in the first set of authentication information into a first authentication information entry field comprised in the front-end interface, in response to an operation from a user; and
   by a computer code of a strong password generation module installed in the user equipment, automatically generating a strong password and assign the strong password as a password comprised in the first set of authentication information.

3. The authentication information manager method as claimed in claim 2, wherein the first networking application provides an application program running on the user equipment or a web-based network service page executed by a browser as the front-end interface for the user to enter the first set of authentication information, and the first set of authentication information at least comprises a username and a password.

4. The authentication information manager method as claimed in claim 1, wherein the mapping node authentication method further comprises one of:
   on the user equipment:
   randomly generating at least one ephemeral decryption key upon receiving the initialization authentication information, wherein the initialization authentication information at least comprises the passcode and the identity information;
   transmitting the at least one ephemeral decryption key to the third-party mapping node and retrieving the key index from the third-party mapping node accordingly;
   encrypting the initialization authentication information or the identity information to generate an electronic digital signature based on a part of the at least one ephemeral decryption key to generate an authentication token; and
   combining the first set of authentication information, the identity information, the key index, and the authentication token selectively to form an ephemeral string and transmitting the ephemeral string to the network application serving device; and
   on the network application serving device:
   receiving and parsing the ephemeral string to acquire the first set of authentication information, the identity information, the key index, and the authentication token;
   requesting to retrieve the at least one ephemeral decryption key from the third-party mapping node based on the key index;

decrypting the authentication token based on a part of the at least one ephemeral decryption key to acquire and verify the electronic digital signature; and decrypting the electronic digital signature based on a part of the at least one ephemeral decryption key to acquire the initialization authentication information.

5. The authentication information manager method as claimed in claim 4, wherein the mapping node authentication method further comprises one of:

on the network application serving device:

implementing a signature verification process to verify whether the electronic digital signature is correctly signed;

implementing an initialization authentication information verification process to verify whether the passcode and the identity information are correctly matched to the respective records; and when one of the verification results of the initialization authentication information verification process and the signature verification process are positive, the user is accepted to log in to the authentication information manager backend platform, otherwise, the user is rejected to access to the authentication information manager backend platform.

6. The authentication information manager method as claimed in claim 1, wherein the physical private key is one of an NFC card and a QR code, and the user equipment is a smartphone, a tablet device, a laptop computer, a notebook computer or a desktop computer.

* * * * *